US007327699B1

(12) United States Patent
Schäfer

(10) Patent No.: US 7,327,699 B1
(45) Date of Patent: Feb. 5, 2008

(54) METHOD AND DEVICE FOR SYNCHRONISATION OF DISTANT CLOCKS TO A CENTRAL CLOCK VIA SATELLITE

(76) Inventor: Wolfgang Schäfer, An der Lehmgrube 7, D-71254 Ditzingen (DE)

( * ) Notice: Subject to any disclaimer, the term of this patent is extended or adjusted under 35 U.S.C. 154(b) by 0 days.

(21) Appl. No.: 09/937,920

(22) PCT Filed: Mar. 30, 2000

(86) PCT No.: PCT/EP00/02838

§ 371 (c)(1),
(2), (4) Date: Jan. 7, 2002

(87) PCT Pub. No.: WO00/60420

PCT Pub. Date: Oct. 12, 2000

(30) Foreign Application Priority Data

Mar. 30, 1999 (DE) ................................ 199 14 355

(51) Int. Cl.
*H04B 7/212* (2006.01)
*H04J 3/06* (2006.01)
*G04C 11/00* (2006.01)

(52) U.S. Cl. ......................... 370/324; 370/507; 368/46

(58) Field of Classification Search ................ 370/505, 370/516, 324, 350, 356, 385, 503, 507–509, 370/519; 308/46, 47, 52, 55, 203, 204; 368/46–48, 368/52

See application file for complete search history.

(56) References Cited

U.S. PATENT DOCUMENTS 3,541,552 A 11/1970 Carlson
3,646,444 A * 2/1972 Bitzer ........................ 375/356
4,346,470 A * 8/1982 Alvarez et al. ............. 370/324
4,368,987 A 1/1983 Waters (Continued)

OTHER PUBLICATIONS

E.L. Gurevich, et al., "Synchronization of Remote Time Scales Via Satellite Communication Channels", *Measurement Techniques*, U.S., Consultants Bureau, New York, vol. 35, No. 7, Jul. 1, 1992, pp. 825-828.

(Continued)

*Primary Examiner*—Wing Chan
*Assistant Examiner*—Hong Sol Cho
(74) *Attorney, Agent, or Firm*—Ostrolenk, Faber, Gerb & Soffen, LLP

(57) ABSTRACT

The invention relates to a method and a device for synchronizing one or more remote clocks (2) to a central clock (1) via a bi-directional satellite radio link (9.1, 9.2). Time and data signals are exchanged via suitable transmitting (8, 12) and receiving devices (5, 11) at both ends of the radio link. From time difference measurements (6, 14) at both ends a control signal (17) is derived in such a manner that the clock (2) installed directly in the remote ground station devices (11) synchronizes in state and rate to the central clock (1) with the aid of the two-way method (TWSTFT, Two-Way Satellite Time and Frequency Transfer). The user has access to time signals (18) which directly represent the state of the central clock (1). The signals used for the time measurement are also used for data transmission, resulting in a system operating in real time in which the control deviations (15, 16) of the remote clock are accessible at both ends of the system.

15 Claims, 1 Drawing Sheet

U.S. PATENT DOCUMENTS

| | | | | |
|---|---|---|---|---|
| 4,494,211 | A | 1/1985 | Schwartz | |
| 4,530,091 | A * | 7/1985 | Crockett | 370/229 |
| 4,561,099 | A * | 12/1985 | Atsugi et al. | 375/344 |
| 4,607,257 | A * | 8/1986 | Noguchi | 340/825.69 |
| 5,245,612 | A * | 9/1993 | Kachi et al. | 370/324 |
| 5,261,118 | A * | 11/1993 | Vanderspool et al. | 455/503 |
| 5,410,588 | A * | 4/1995 | Ito | 455/502 |
| 5,416,808 | A * | 5/1995 | Witsaman et al. | 375/356 |
| 5,481,258 | A * | 1/1996 | Fawcett et al. | 340/7.26 |
| 5,577,024 | A * | 11/1996 | Malkamaki et al. | 370/335 |
| 5,666,330 | A * | 9/1997 | Zampetti | 368/47 |
| 5,884,142 | A * | 3/1999 | Wiedeman et al. | 455/12.1 |
| 6,128,469 | A * | 10/2000 | Zenick et al. | 455/12.1 |
| 6,157,957 | A * | 12/2000 | Berthaud | 709/248 |
| 6,278,660 | B1 * | 8/2001 | Tognazzini | 368/21 |
| 6,298,014 | B1 * | 10/2001 | Kihara et al. | 368/46 |
| 6,347,084 | B1 * | 2/2002 | Hulyalkar et al. | 370/347 |
| 6,633,590 | B1 * | 10/2003 | Garofalo et al. | 370/507 |
| 6,654,356 | B1 * | 11/2003 | Eidson et al. | 370/303 |
| 6,674,730 | B1 * | 1/2004 | Moerder | 370/316 |
| 6,870,819 | B1 * | 3/2005 | Potier | 370/324 |

OTHER PUBLICATIONS

D. Kirchner, "Two-Way Time Transfer Via Communication Satellites", *Proceedings of the IEEE*, U.S., IEEE, New York, vol. 79, No. 7, Jul. 1, 1991, pp. 983-990.

* cited by examiner

METHOD AND DEVICE FOR SYNCHRONISATION OF DISTANT CLOCKS TO A CENTRAL CLOCK VIA SATELLITE

BACKGROUND OF THE INVENTION

In recent times, satellite-based time signals are being increasingly emitted in addition to terrestrially emitted time signals, e.g. DCF-77. The most well known methods are the GPS system and the GLONASS system.

A serious disadvantage is the necessity of highly accurate satellite positioning and exact knowledge of the transmission path, especially of the ionosphere and troposphere, which is indispensable to a user requiring maximum accuracy. In addition, the satellite signals are deliberately corrupted for civilian users ("selective availability") in order to prevent non-military utilization requiring maximum accuracy. Methods have been developed which allow for partial compensation to these uncertainties (e.g. differential GPS). The difficulties relating to using the GPS signal for high-precision time applications have so far not been satisfactorily solved.

The said methods are widely used because of the inexpensive availability of suitable receiving devices. An operational disadvantage is seen in just this military nature of the systems which impede industrial utilization. Satellite-based time signals require an extensive infrastructure for monitoring and verification. A further disadvantage is that high-precision data are available only with time delays of hours or longer from the said systems.

The two-way method (TWSTFT, Two-Way Satellite Time and Frequency Transfer) for time transmission is particularly suitable for metrological purposes. It is a method used by national calibration authorities (e.g. PTB Brunswick) for comparing existing time scales based on atomic clocks.

The advantage of this method lies in the basic independence of satellite position and of errors due to the transmission path. It can be derived directly from the symmetry of the method. Since both connection partners require both a transmitting and a receiving device, the application of the method is restricted to a few national authorities (DE, GB, FR, OE, US, IA, IT, ES, NL) because of the relatively high costs. Different transmission methods can be used: FDMA (Frequency Division Multiple Access), CDMA (Code Division Multiple Access) or TDMA (Time Division Multiple Access), and the multiplex method in which

- the remote ground station can be connected to a system of redundant central clocks
- an arbitrary number of remote ground stations can be connected to the central clock
  - an arbitrary number of remote ground stations can be connected to a redundant system of central clocks.

The increasing availability of small inexpensive satellite ground stations with transmitting device now pushes the system-related disadvantages more and more into the background. It seems natural to make the two-way method, which has been successful for years, accessible to widespread use as an alternative to one-way methods (GPS, GLONASS).

A barrier to this has previously been that the 2-way method, also called TWSTFT (Two-Way Satellite Time and Frequency Transfer) was restricted to the comparison of existing clocks located externally to the devices described here and that the measurement results are only published with a time delay of up to several days after corresponding calculations by the BIPM (Bureau International des Poids et Mesures, Paris).

SUMMARY

These disadvantages are eliminated by the method by means of five essential innovations:

1. In the remote station, there is a physical clock with additional power reserve. Thus, it is no longer necessary to have a highly accurate external clock as previously in the case of 2-way time transfer but the clock installed directly in the device is used. The additional power reserve allows communications interruptions to be bridged with reduced accuracy. If communication is not possible between the central and the remote clocks, the remote clock has additional power reserve to continue to keep or count time with its time rate. The accuracy of such time keeping is reduced because the remote clock does not know the exact time of the central clock because of the communication interruptions.
2. The signals used for time transmission are at the same time used for the bi-directional exchange of the 2-way measurement data. A central clock sends a time signal including the current time of this clock to another remote clock. At the time of the reception of this time signal, the remote clock determines the time difference between the current time of the remote clock and the received time of the central clock: this is one measurement data. After that the remote clock sends a time signal to the central clock including the local time and the calculated time difference. The central clock determines the current time difference. The central clock determines the current time difference in the same procedure. With both time differences it is possible to calculate the time, which the signal needs to move from the central clock to the remote clock. If the rate of both clocks is the same it is possible to send a special time signal to synchronize the remote clock. If the rate of both clocks is not the same a control loop is necessary.
3. Due to the continuously updated measurement data, the remote clock synchronizes to the central clock via a control loop by applying the system-related corrections. The system-related corrections are recognized from system-related corrections data, e.g., for power supply failures or signal disturbances, required to check system problems, which is also exchanged between the stations.
4. The time and frequency information available at the remote clock is available to the user in the form of externally accessible electrical signals.
5. The quality of synchronization can be checked with minimum time delay due to the continuous updating of the measurement data.

The user derives the following advantages from the method:

1. Independence of infrastructures having military and/or multinational character.
2. There is no impairment of the data quality deliberately introduced for military reasons ("Selective Availability").
3. Utilizing the measurement method according to the 2-way principle which has been introduced, the system ensures a high degree of independence of the satellite position. It operates without knowledge of the propagation time along the transmission path.
4. The quality of the clock installed in the remote station can be much lower and less expensive in comparison with atomic clocks since this clock is matched to the central clock by means of a continuous control loop.
5. The method is suitable, in particular, also to prevent system drift with such a reliability which is not possible for reasons of principle in practical operation even with commercial atomic clocks of maximum quality.

6. The method operates in real time without elaborate reprocessing of the data.
7. The user has access to time signals which can be used directly.
8. The method has calibration quality due to a direct relation to a recognized time scale.
9. The measuring method is directly accessible to calibration.

The object of the invention is, therefore, a method and a device for synchronizing remote clocks to a central clock via satellite.

This object is achieved by means of a device of the invention and by a method having the features of the invention. There is a central clock and at least one remote clock at separated locations. Each of the clocks has a bi-directional, two-way satellite communication link, wherein both the central clock and each remote clock transmits and receives time signals respectively to and from the satellite; each of the central clock and the remote clocks determines measurement data comprising the time difference between the time of reception of the signal transmitted by the other of the remote and central clocks. Each of the central clock and the remote clocks intermittently exchanges measurement data together with system related correction data, and the remote clock is synchronized in state and rate to the central clock based on the measurement data. A control loop in the remote clock synchronizes the remote clock to the central clock.

DETAILED DESCRIPTION OF THE INVENTION

Figure 1:
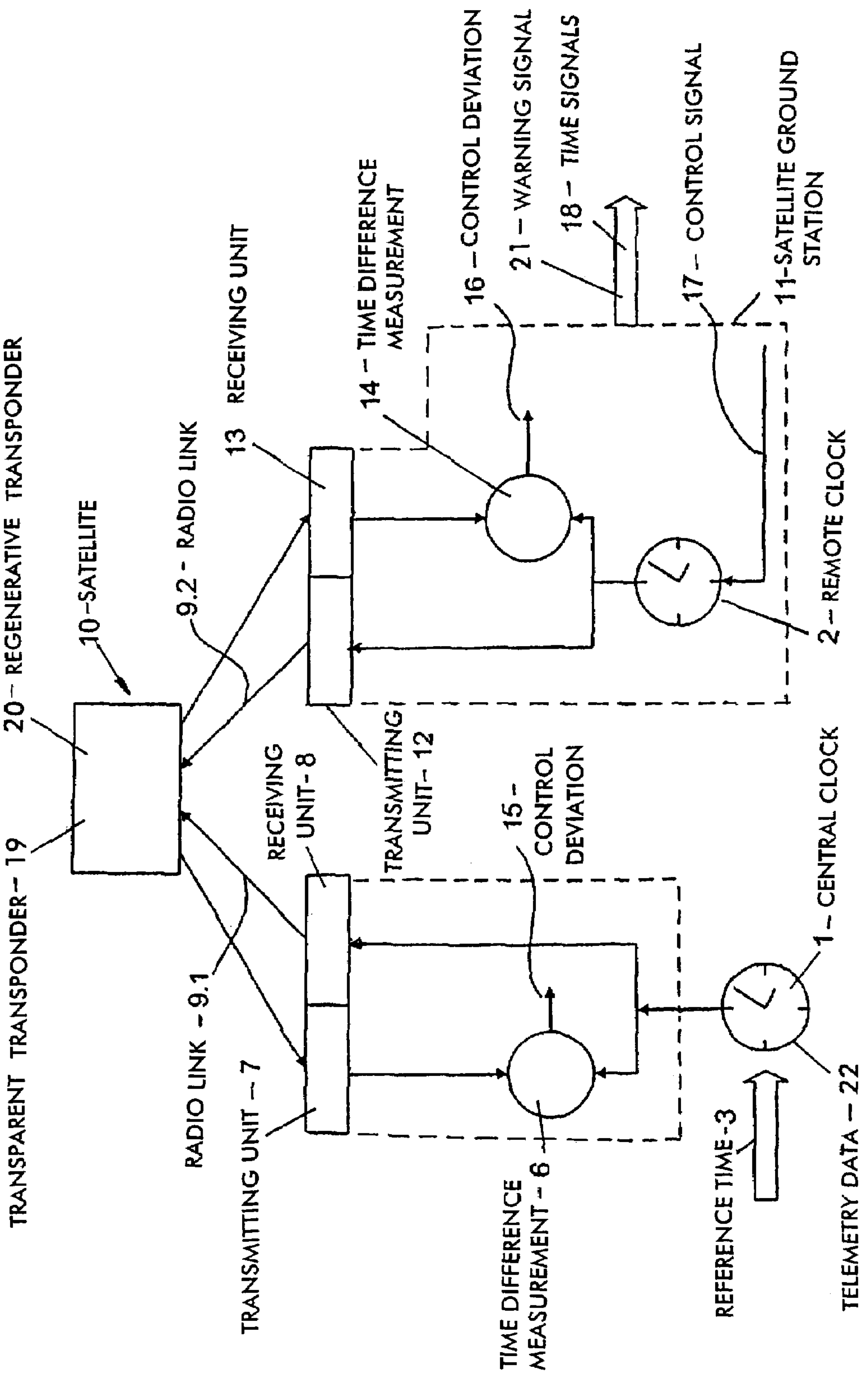
FIG. 1 is a block diagram of elements used in synchronizing remote clocks to a central clock via a satellite.

The invention is described in greater detail with reference to FIG. 1. FIG. 1 shows an example of a simple combination consisting of a central clock (1) in a satellite ground station (5) and a remote clock (2) in another satellite ground station (11), a control signal (17) being obtained by means of suitable measuring apparatus consisting of a transmitting (7) and receiving unit (8) in the central station and the corresponding transmitting (12) and receiving unit (13) in the remote station, in such a manner that the remote clock (2) is synchronized with the central clock (1) in state and rate, i.e., the time and rate of the remote clock is the same as that of the central clock. For this purpose, both stations are connected with a bi-directional radio link (9.1) and (9.2) via a satellite (10) and exchange the results (15, 16) from time difference measurements (6, 14) in real time in both stations directly via the radio link (9.1, 9.2) via which the time signals of the stations are also exchanged. A transparent (19) or a regenerative (20) transponder can be located on board the satellite (10). The correcting variable of the control loop (17) is formed from the difference of the two time difference measurements in the remote ground station. It influences the frequency of the remote clock (2). The reference time (3) of the central clock is provided to the user at the remote clock in the form of time signals (18). The user can also be informed in digital form of the current state of the remote clock (2) with respect to the central clock (1). Furthermore, the user can be supplied with a warning signal (21) if the deviation of the remote clock (2) with respect to the central clock (1) exceeds a limit value.

The respective state of the remote clock (2) is available in form of telemetry data (22) at the central clock.

The symmetry of the overall configuration and of the radio link are determining for the elimination of the unknown time delays of the transmission path and by the satellite.

What is claimed is:

1. A method for synchronizing a remote clock to a central clock, the method comprising the steps of:

providing a central clock and a remote clock at separate locations;

connecting the central clock and the remote clock via a bi-directional, two-way satellite communication link;

bi-directionally transmitting and receiving time signals between the central clock and the remote clock via a satellite;

the central clock and the remote clock determining a measurement data, by the central clock determining a first time difference between the local time of the remote clock and the time of the central clock when the central clock receives a time signal carrying the local time of the remote clock, and by the remote clock determining a second time difference between the local time of the central clock and the time of the remote clock when the remote clock receives a time signal carrying the local time of the central clock;

each of the central clock and the remote clock intermittently exchanging the measurement data and system related correction data including bi-directionally transmitting and receiving the determined first time difference and the determined second time difference between the central clock and the remote clock via the satellite; and synchronizing the remote clock in state and rate to the central clock based on the bi-directionally transmitted and received first and second time signals, on the measurement data including the bi-directionally transmitted and received first and second time differences and on system related corrections exchanged between the central and remote clocks.

2. Method according to claim 1, wherein the remote ground station is connected to the central clock via a frequency division multiple access (FDMA) method.

3. Method according to claim 1, wherein the remote ground station is connected to the central clock via a code division multiple access (CDMA) method.

4. Method according to claim 1, wherein the remote ground station is connected to the central clock via a time division multiple access (TDMA) method.

5. Method according to claim 1, wherein the remote ground station is connected to the central clock via one or more satellites.

6. Method according to claim 1, wherein the remote ground station is connected to a system of redundant central clocks via a multiplex method.

7. Method according to claim 1, wherein an arbitrary number of remote ground stations is connected to the central clock via a multiplex method.

8. Method according to claim 1, wherein an arbitrary number of remote ground stations is connected to a redundant system of central clocks via a multiplex method.

9. Method according to claim 1, wherein a transparent transponder is located on board the satellite.

10. Method according to claim 1, wherein a regenerative transponder is located on board the satellite.

11. Method according to claim 1, wherein the user is informed in digital form of the current state of the remote clock with respect to the central clock.

12. Method according to claim 1, wherein the user is supplied with a warning signal if the deviation of the remote clock with respect to the central clock exceeds a limit value.

13. Method according to claim 1, wherein the respective state of the remote clocks is available in the form of telemetry data at the central clock.

14. The method of claim 1, further comprising the step of synchronizing the remote clock by operating a control loop in the remote clock, the operation being based on measurement data.

15. Apparatus for synchronizing a remote clock with a central clock, the apparatus comprising:

a satellite;

a central clock having a first bi-directional, two-way satellite communication link for the central clock and further comprising a first transmitting device and a first receiving device;

a remote clock separated from the central clock having a second bi-directional, two-way satellite communication link for the remote clock and further comprising a second transmitting device and a second receiving device;

circuitry in each of the central clock and the remote clock for determining a measurement data including the first time difference determined by the central clock between the local time of the remote clock and the time of the central clock when the central clock receives a first time signal carrying the local time of the remote clock; and the second time difference determined by the remote clock between the local time of the central clock and the time of the remote clock when the remote clock receives a second time signal carrying the local time of the central clock, the second time signal and the first time difference being transmitted by the first transmitting device and being received by the second receiving device, and the first time signal and the second time difference being transmitted by the second transmitting device and being received by the first receiving device;

a control loop in the remote clock for synchronizing the remote clock in state and rate to the central clock based on the first and second time signals, the measurement data including the first time difference and the second time difference and on system related corrections exchanged between the central and remote clocks.

* * * * *